US012456408B2

(12) United States Patent
Wang

(10) Patent No.: US 12,456,408 B2
(45) Date of Patent: Oct. 28, 2025

(54) COLOR TEMPERATURE ADJUSTMENT METHOD, DISPLAY DEVICE, AND COMPUTER-READABLE STORAGE MEDIUM

(71) Applicant: MediaTek Singapore Pte. Ltd., Singapore (SG)

(72) Inventor: Yuesheng Wang, Anhui (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 1 day.

(21) Appl. No.: 18/662,092

(22) Filed: May 13, 2024

(65) Prior Publication Data

US 2025/0006096 A1 Jan. 2, 2025

(30) Foreign Application Priority Data

Jun. 27, 2023 (CN) ......................... 202310773132.7

(51) Int. Cl.

*G09G 3/20* (2006.01)
*G09G 3/00* (2006.01)
*G09G 3/34* (2006.01)
*G09G 3/36* (2006.01)

(52) U.S. Cl.

CPC ........... *G09G 3/2003* (2013.01); *G09G 3/001* (2013.01); *G09G 3/3413* (2013.01); *G09G 3/36* (2013.01); *G09G 2320/0285* (2013.01); *G09G 2320/0626* (2013.01); *G09G 2320/0666* (2013.01)

(58) Field of Classification Search

CPC .... G09G 3/001; G09G 3/2003; G09G 3/3413; G09G 3/32; G09G 3/36; G09G 2320/0285; G09G 2320/0626; G09G 2320/0666

See application file for complete search history.

(56) References Cited

U.S. PATENT DOCUMENTS

2018/0226055 A1* 8/2018 Raymann ............ G06F 3/04847

FOREIGN PATENT DOCUMENTS

CN 107094335 A * 8/2017 ......... H05B 33/0845

* cited by examiner

*Primary Examiner* — Cory A Almeida
(74) *Attorney, Agent, or Firm* — McClure, Qualey & Rodack, LLP

(57) ABSTRACT

A color temperature adjustment method and a related device are provided. The color temperature adjustment method includes determining display brightness of an image and a viewing distance, wherein the viewing distance is a distance between a user and the image; determining a target color temperature based on the display brightness of the image and the viewing distance; and adjusting a color temperature of the image to the target color temperature. The present invention can improve conform of viewing images displayed on the device and/or eye protection.

9 Claims, 4 Drawing Sheets

COLOR TEMPERATURE ADJUSTMENT METHOD, DISPLAY DEVICE, AND COMPUTER-READABLE STORAGE MEDIUM

CROSS REFERENCE TO RELATED APPLICATIONS

This application claims priority of China Patent Application No. 202310773132.7 filed on Jun. 27, 2023, the entirety of which is incorporated by reference herein.

BACKGROUND OF THE INVENTION

Field of the Invention

The present invention relates to a field of display technology, in particular to a color temperature adjustment method and related devices.

Description of the Related Art

In recent years, as the usage of electronic devices such as computers, televisions, mobile phones, tablets, and projectors has become more common, and the time for human eyes to view images displayed on the electronic devices has become longer, which has aggravated eye fatigue. Therefore, improvement in comfort of viewing displayed images and eye protection plays a very important role in consumer electronics devices. especially in educational equipment, which has become the feature that consumers pay most attention to.

However, there are still certain deficiencies in the viewing comfort and/or eye protection functions of existing electronic devices such as computers, televisions, mobile phones, tablets, and projectors.

BRIEF SUMMARY OF THE INVENTION

The invention provides a color temperature adjustment method and a related device, which can improve comfort of viewing images displayed on the device and/or eye protection.

In order to achieve the above purpose, the present invention provides a color temperature adjustment method, which comprises:

- determining display brightness of an image and a viewing distance, wherein the viewing distance is a distance between a user and the image;
- determining a target color temperature based on the display brightness of the image and the viewing distance; and
- adjusting a color temperature of the image to the target color temperature.

The prevent invention first determines the display brightness of the image and the viewing distance, then determines the target color temperature of the image based on the display brightness of the image and the viewing distance, and then adjusts the color temperature of the image to the target color temperature that is determined based on the display brightness of the image and the viewing distance. Accordingly, the color temperature of the image can be adaptively adjusted based on the display brightness of the image and the viewing distance to improve conform of viewing displayed images and eye protection.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The technical solutions in the embodiments of the present invention will be clearly and completely described below with reference to the accompanying drawings of the embodiments of the present invention. Obviously, the described embodiments are only some of the embodiments of the present invention, rather than all of the embodiments. Based on the embodiments in the present invention, all other embodiments obtained by those of ordinary skill in the art without creative efforts fall within the scope protected by the preset invention. Additionally, the term "or" as used herein refers to a non-exclusive term "or" (that is, "and/or") unless stated otherwise (for example, "or additionally" or "or in the alternative"). Also, the various embodiments described herein are not necessarily mutually exclusive, as some embodiments may be combined with one or more other embodiments to form new embodiments.

Figure 1:
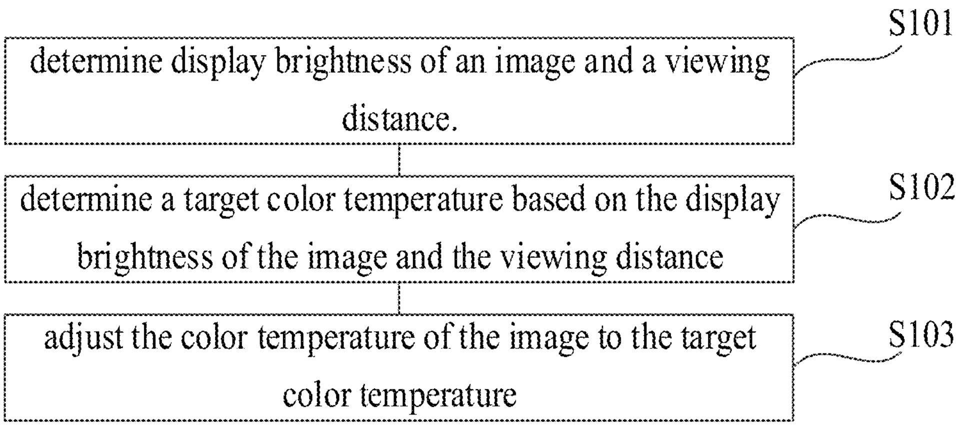
FIG. 1 is a schematic flow chart of color temperature adjustment method according to an exemplary embodiment of the present invention.

This application proposes a color temperature adjustment method. As shown in FIG. 1, a color temperature adjustment method of the present invention comprises the following steps. Optionally, the color temperature adjustment method of the present invention can be applied in a display device. The display device may be a mobile phone, a computer, a projector, or another device with a function of displaying images. It should be noted that the numbers of the following steps are only used to simplify the description and are not intended to limit the execution order of the steps. The execution order of the steps in each embodiments can be changed arbitrarily without violating the technical idea of the present invention.

S101: determining display brightness of an image and a viewing distance.

The display brightness of the image and the viewing distance can be determined first so that a target color temperature of the image can be determined based on the display brightness of the image and the viewing distance, and then a color temperature of the image can be adjusted to the target color temperature that is determined based on the display brightness of the image and the viewing distance. Thus, the color temperature of the image can be adaptively adjusted based on the display brightness of the image and the viewing distance to improve conform of viewing displayed images and eye protection.

Optionally, for a device that displays images on a display screen, brightness of the display screen can be used as display brightness of an image. For example, if the display screen of the device is an LCD screen, the backlight brightness can be used as the display brightness of the image.

In another embodiment, a device performing the color temperature adjustment method of the present invention may be a projection device, and display brightness of an image may be determined based on projection brightness of the projection device. For example, the projection brightness of the projection device can be used as the display brightness of the image. Alternatively, the display brightness of the image may be determined based on the distance between the projection device and a displayed image and the projection brightness of the projection device. In a specific example, an adjustment ratio corresponding to the distance between the projection device and the displayed image can be multiplied by the projection brightness of the projection device to obtain the display brightness of the image. Optionally, an adjustment ratio corresponding to the distance between the projection device and the displayed image may be negatively correlated to the distance between the projection device and the displayed image.

Optionally, the viewing distance is the distance between the user and the image. The viewing distance can be determined in several ways.

For example, for a device that displays images on a display screen, a distance sensor is disposed on the display screen, and the distance sensor on the display screen may be used to detect the distance between the user and the display screen (that is, an image).

For another example, a distance between the user and an image can be determined through a picture including the user that is taken by a camera. In a specific example, for a projection device that performs the color temperature adjustment method of the present invention, a camera device can be disposed on the projection device so that the camera device on the projection device can take a picture including the user and an image, and the distance between the user and the image can be determined through the picture including the user and the image. In another specific example, for a device that displays images on a display screen, a camera device may be disposed on the display screen, and a distance between the user and the display screen (that is, an image) can be determined through a picture including the user that is taken by the camera device on the display screen.

In addition, for a projection device that performs the color temperature adjustment method of the present invention, if it is necessary to determine the distance between the projection device and a displayed image, the distance between the projection device and the displayed image can be detected based on a distance sensor or a camera device.

S102: determining a target color temperature based on the display brightness of the image and the viewing distance.

After the display brightness of the image and the viewing distance are determined, the target color temperature of the image can be determined based on the display brightness of the image and the viewing distance.

Optionally, for a purpose of controlling blue light energy, the target color temperature can be determined based on the display brightness of the image and the viewing distance.

In an embodiment, since the display brightness of the image is stronger, the blue light energy is stronger. Thus, the blue light energy received by the user can be reduced by appropriately lowering the color temperature. Accordingly, a first adjustment ratio corresponding to the display brightness of the image can be determined so that the target color temperature that is obtained by performing a calculation on the first adjustment ratio and the current color temperature of the image is negatively correlated to the display brightness of the image within a certain range. In this way, through setting the first adjustment ratio, when the display brightness of the image becomes stronger, the amount of blue light energy received by the user can be reduced by lowering the target color temperature. In addition, when the user is closer to the screen, the blue light of the image that the user receives is stronger. Thus, the blue light energy can be reduced by appropriately lowering the color temperature. Based on this, a second adjustment ratio corresponding to the viewing distance can be determined so that the target color temperature that is obtained by performing a calculation on the second adjustment ratio and the current color temperature of the image is positively correlated to the viewing distance within a certain range. In this way, through the setting of the second adjustment ratio, when the viewing distance is less, the amount of blue light energy received by the user can be reduced by lowering the target color temperature.

Thus, in Step S102, the first adjustment ratio corresponding to the display brightness of the image and the second adjustment ratio corresponding to the viewing distance can be determine. Based on the first adjustment ratio, the second adjustment ratio, and the current color temperature, the target color temperature is calculated. Further, when the display brightness of the image is within a first preset range, the display brightness of the image may be negatively correlated to the first adjustment ratio; when the viewing distance is within a second preset range, the viewing distance may be positively correlated to the second adjustment ratio. In Step S102, the current color temperature of the image, the first adjustment ratio, and the second adjustment ratio can be multiplied together to obtain the target color temperature of the image. In other embodiments, a preset color temperature of the image, the first adjustment ratio, and the second adjustment ratio can be multiplied together to obtain the target color temperature of the image. The preset color temperature of the image can be a preset constant, which is not limited here.

Moreover, the corresponding relationship between the display brightness of the image and the first adjustment ratio and the corresponding relationship between the viewing distance and the second adjustment ratio can be stored into the memory/processor of the display device before the display device leaves the factory so that the first adjustment ratio corresponding to the display brightness of the image and the second adjustment ratio corresponding to the viewing distance can be determined later when the display device operates.

Figure 2:
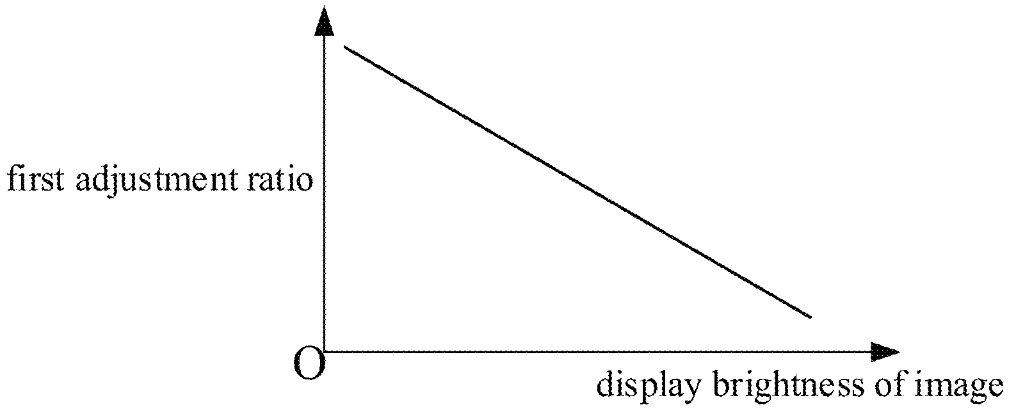
FIG. 2 is a schematic diagram showing a relationship between a first adjustment ratio and display brightness of an image in a color temperature adjustment method according to an exemplary embodiment of the present invention.
Figure 3:
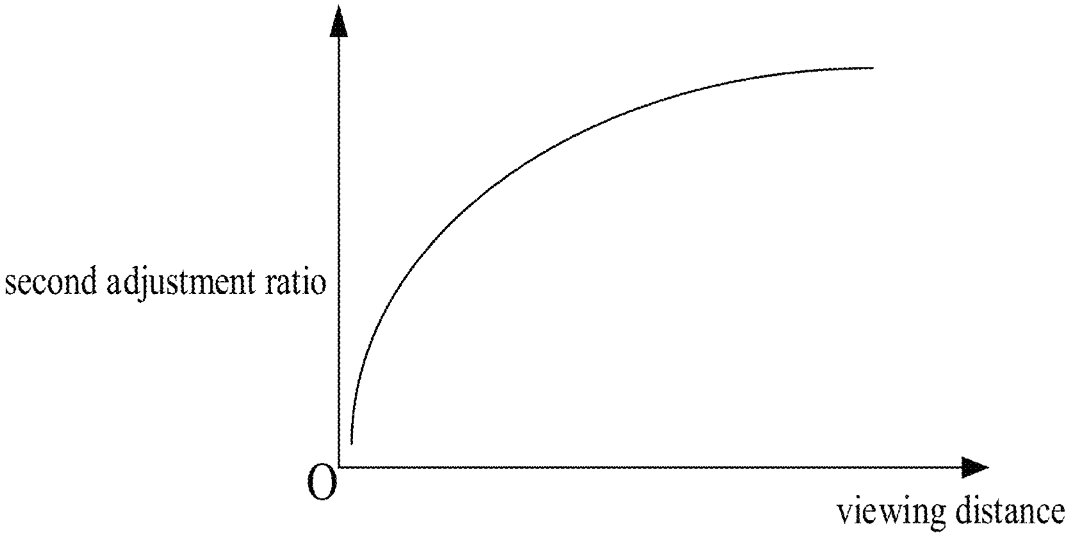
FIG. 3 is a schematic diagram showing a relationship between a second adjustment ratio and a viewing distance in a color temperature adjustment method according to an exemplary embodiment of the present invention.

In addition, the corresponding relationship between the display brightness of the image and the first adjustment ratio and the corresponding relationship between the viewing distance and the second adjustment ratio can be determined based on a first law of illumination. For example, the correlation between the display brightness of the image and the first adjustment ratio can be presented by a straight line as shown in FIG. 2, and the correlation between the viewing distance and the second adjustment ratio can be presented by a curve as shown in FIG. 3.

In another embodiment, the target color temperature can be found or obtained from a lookup table of display brightness of images, viewing distances, and target color temperatures according to the display brightness of the image and the viewing distance.

Optionally, the lookup table of display brightness of images, viewing distances, and target color temperatures may also be determined for the purpose of adjusting the blue light energy received by the user.

In a specific example, the lookup table of display brightness of images, viewing distances, and target color temperatures may at least comprise data of the display brightness of the images, the viewing distances, the blue light energy, and the target color temperatures. Accordingly, the step of determining the lookup table of display brightness of images, viewing distances, and target color temperatures may comprise: determining the blue light energy received by the user under each display brightness of the image, each viewing distance, and each screen color temperature so that the lookup table of display brightness of images, viewing distances, target color temperatures, and blue light energy is obtained. In order to find or obtain a target color temperature from the lookup table of display brightness of images, viewing distances, and target color temperatures, the target blue light energy under different display brightness of images and different viewing distances can also be set. Thus, in step S102, the target blue light energy can be determined based on the current display brightness of the image and the current viewing distance, and then the target color temperature of the image is found or obtained from the above-mentioned lookup table based on the current display brightness of the image, the current viewing distance, and the target blue light energy. Optionally, before the target blue light energy at different screen display brightness and different viewing distances are set, the blue light energy received at different screen display brightness and different viewing distances is measured for evaluating the blue light energy radiation of the display device thereby performing the setting of target blue light energy under different display brightness of the image and different viewing distances. In addition, the data of the set target blue light energy under different display brightness of the image and different viewing distances and the lookup table of display brightness of images, viewing distances, target color temperatures, and the blue light energy are stored into the memory/process of the display device before it leaves the factory so that the target color temperature can be determined later when the display device operates.

In another specific example, the lookup table of display brightness of images, viewing distances, and target color temperatures may be a table that comprises only the data of display brightness of images, viewing distances, and target color temperatures. In this way, the step of determining the lookup table of display brightness of images, viewing distances, and target color temperatures may comprise: first setting the target blue light energy under different display brightness of the image and different viewing distances, and then determining to which value the color temperature is adjusted at each display brightness of the image and the viewing distance for causing the blue light energy received by the user to be equal to the target blue light energy, thereby determining a target color temperature (the target color temperature corresponding to the target blue light energy) at each display brightness of the image and the viewing distance. In this way, the lookup table of display brightness of images, viewing distances, and target color temperatures can be obtained. Optionally, the lookup table of display brightness of images, viewing distances, and target color temperatures can be stored into the memory/processor of the display device before the display device leaves the factory so that the target color temperature can be determined later when the display device operates.

Figure 4:
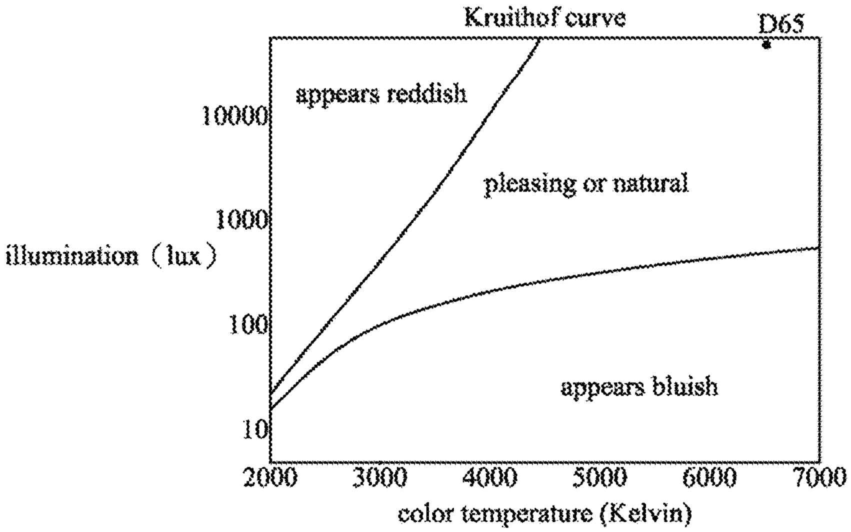
FIG. 4 is a schematic diagram showing a Kruithof curve in a color temperature adjustment method according to an exemplary embodiment of the present invention.

In another embodiment, for the purpose of improving comfort of viewing displayed images, the target color temperature can be determined based on the display brightness of the image and the viewing distance. Specifically, the illuminance can be determined based on the display brightness of the image and the viewing distance, and then the target color temperature can be determined based on the determined illuminance. Optionally, based on the illumination, a comfortable color temperature range of the image under the illumination can be found or obtained from the Kruithof curve as shown in FIG. 4, and then a value is selected from the color temperature range of the image as the target color temperature. For example, the middle value or any value can be selected from the color temperature range of the image as the target color temperature. The Kruithof curve is an illumination-color temperature curve that was built to make the observer comfortable and satisfied by Dutch physicist Arie Andries Kruithof through collecting psychophysical data. The conditions of the illumination-color temperature combination in the unfilled bounded region in the curve are empirically estimated as being pleasing or natural, while the conditions outside the region are estimated as being uncomfortable, displeasing, or unnatural. Optionally, the Kruithof curve can be stored into the memory/processor of the display device before the display device leaves the factory so that the target color temperature can be determined later when the display device operates. Of course, in other embodiments, the Kruithof curve may not be stored into the memory/processor of the display device. In these embodiments, when the display device operates, the display device may obtain the Kruithof curve from the server and search the target color temperature based on the obtained Kruithof curve.

The method of determining the illumination based on the display brightness of the image and the viewing distance is not limited here. For example, the illuminance can be calculated based on the first law of illuminance ($E=I/R^2$) and by taking the display brightness of the image and the viewing distance into the first law. For another example, the illuminance at the current display brightness of the image and the current viewing distance can be found or obtained based on the lookup table of display brightness of images, viewing distances, and the illuminance. The lookup table of display brightness of images, viewing distances, and illuminance can be determined according to the illuminance under all combinations of the display brightness of the image and the viewing distance measured by an optical instrument. Optionally, the lookup table of display brightness of images, viewing distances, and the illuminance can be stored into the memory/processor of the display device before the display device leaves the factory so that the illuminance can be determined later when the display device operates.

S103: adjusting the color temperature of the image to the target color temperature.

After the target color temperature is determined based on the display brightness of the image and the viewing distance, the color temperature of the image can be adjusted to the target color temperature.

Optionally, the color temperature of the image can be adjusted according to the RGB data of the image.

In the embodiment, the display brightness of the image and the viewing distance are first determined, and then the target color temperature of the image is determined based on the display brightness of the image and the viewing distance. Then, the color temperature of the image is adjusted to the target color temperature that is determined based on the display brightness of the image and the viewing distance so that the color temperature of the image can be adaptively adjusted based on the display brightness of the image and the viewing distance to improve comfort of viewing displayed the image and/or eye protection.

Figure 5:
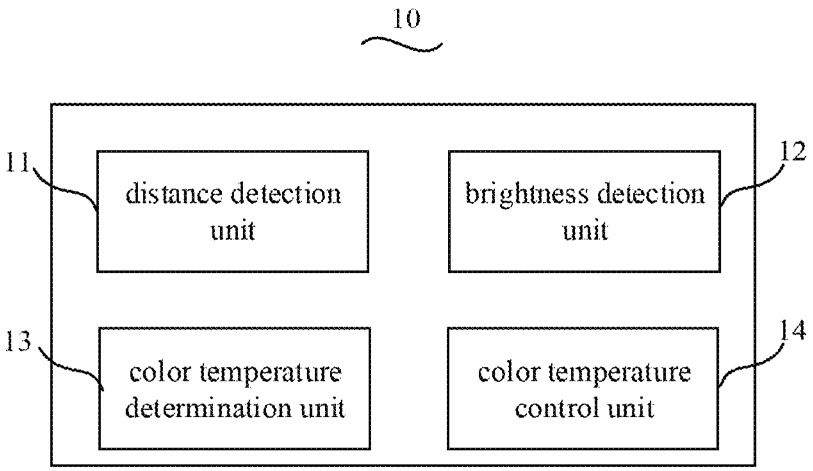
FIG. 5 is a schematic structural diagram showing a color temperature adjustment device according to an exemplary embodiment of the present invention.

FIG. 5 is a schematic structural diagram showing a color temperature adjustment device according to an exemplary embodiment of the present invention. A color temperature adjustment device 10 of the present invention comprises a distance detection unit 11, a brightness detection unit 12, a color temperature determination unit 13, and a color temperature control unit 14. The distance detection unit 11 is configured to determine a viewing distance that is the distance between the user and the image. The brightness detection unit 12 is configured to determine the display brightness of the image. The color temperature determination unit 13 is configured to determine a target based on the display brightness of the image and the viewing distance. The color temperature control unit 14 is configured to adjust the color temperature of the image to the target color temperature. The relation between the units and the more specific function of each unit are described in the above embodiments and will not be described again here.

In order to better explain the color temperature adjustment method of the present invention, the following specific embodiments of the color temperature adjustment are provided for illustrative explanation:

EMBODIMENT 1

When the brightness of the screen is stronger, the blue light energy of the screen is stronger. Thus, the blue light energy can be reduced by appropriately lowering the color temperature:

TargetCCTBrightness=OriginalCCT*RatioBrightness

RatioBrightness represents the color temperature ratio to be adjusted corresponding to the brightness of the screen (that is the first adjustment ratio), and TargetCCTBrightness represents the target color temperature of the screen corresponding to the brightness of the screen.

When the human eyes are closer to the screen, since the blue light received by the human eyes from the screen is stronger. Thus, the blue light energy can be reduced by appropriately lowering the color temperature.

TargetCCTDistance=TargetCCTBrightness*RatioDistance

RatioDistance represents the color temperature ratio to be adjusted at the corresponding distance (that is the second adjustment ratio), and TargetCCTDistance represents the target screen color temperature at the corresponding distance.

Since the amount of reduction in the energy from the same distance increases more at a short distance, the color temperature is lowered more at a closer distance. That is, as the viewing distance decreases, the amplitude of the decrement in the RatioDistance curve becomes greater.

The blue light energy received by the human eyes can be more accurately determined by the combination of the brightness of the screen and the distance, and then the target color temperature (or the amplitude of the adjustment in the color temperature) can be determined based on these two factors. Optionally, the target color temperature of the image can be calculated through the following expression:

TargetCCT=OriginalCCT*RatioBrightness*RatioDistance;

OriginalCCT is the current color temperature/preset color temperature of the image, and TargetCCT represents the final target color temperature.

Embodiment 2

At the same distance, the amount of brightness of the screen determines the intensity of the blue light energy of the screen itself. At the same brightness of the screen, the distance between the user and the screen determines the intensity of the blue light received by the user. Thus, the blue light energy received by the eyes of the user can be accurately determined according to the combination of the above brightness of the screen and the above distance.

First, different brightness of the screen and the blue light energy at different distances can be measured to form a mapping table EHEVLUT [Brightnes] [Distance]. In this way, the current brightness of the screen and the current blue light energy value at the current distance of the user can be determined according to “the current blue light energy value CurrentEHEV=EHEVLUT (the current brightness of the screen, the current distance of the user)”, wherein, EHEVLUT (the current brightness of the screen, the current distance of the user) represents that the current blue light energy value is obtained based on the current brightness of the screen and the distance of the user.

The target blue light energy TargetEHEV=TargetEHEVLUT (current screen brightness, current user distance) can be set under different screen brightness and user distance. TargetEHEVLUT represents the target blue light energy at different distances and different screen brightness. TargetEHEVLUT (current screen brightness, current user distance) represents obtaining the current target blue light energy based on the current distance and screen brightness. TargetEHEV represents the target blue light energy.

Since the blue light energy under the same brightness of the screen, the same distance, and at different color temperatures of the screen is different, the correspondence relationship table EHEVLUT[Brightnes][Distance][CCT] between these three factors can be measured. The correspondence relationship table EHEVLUT[Brightnes][Distance][CCT] of these three factors can represent the blue light energy under different brightness of the screen, different viewing distances, and different color temperatures.

Based on the above preparations, during the adjustment of the color temperature, the target blue light energy at the current brightness of the screen and the current viewing distance can be determined first. Then, the current target color temperature is obtained based on the current distance, the brightness of the screen, and the target blue light energy, that is, the current target color temperature TargetCCT=TargetCCT (the current brightness of the screen, the current distance of the user, the target blue light energy). TargetCCT (the current brightness of the screen, the current distance of the user, the target blue light energy) represents that the target color temperature is obtained according to the brightness of the screen, the current distance of the user, and the target blue light energy.

Figure 6:
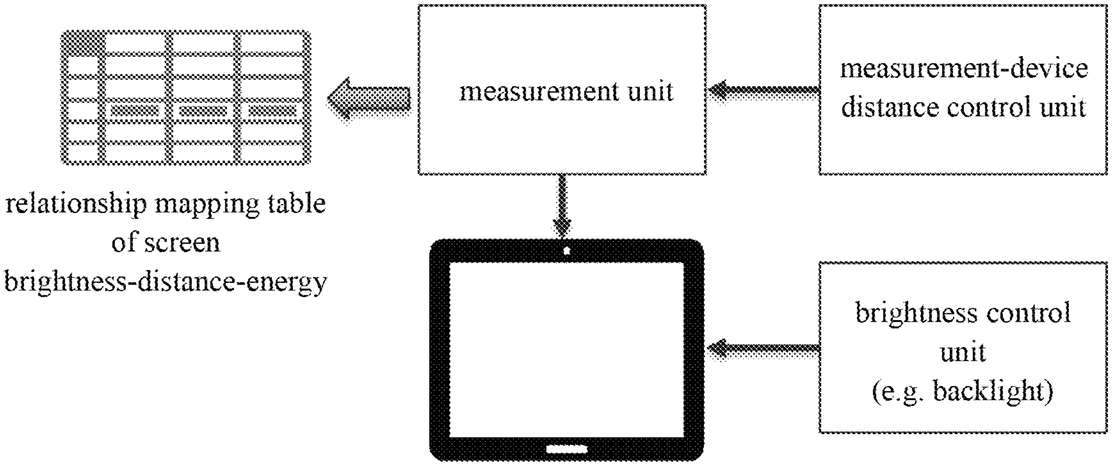
FIG. 6 is an interactive schematic diagram of a color temperature adjustment device according to an exemplary embodiment of the present invention.
Figure 7:
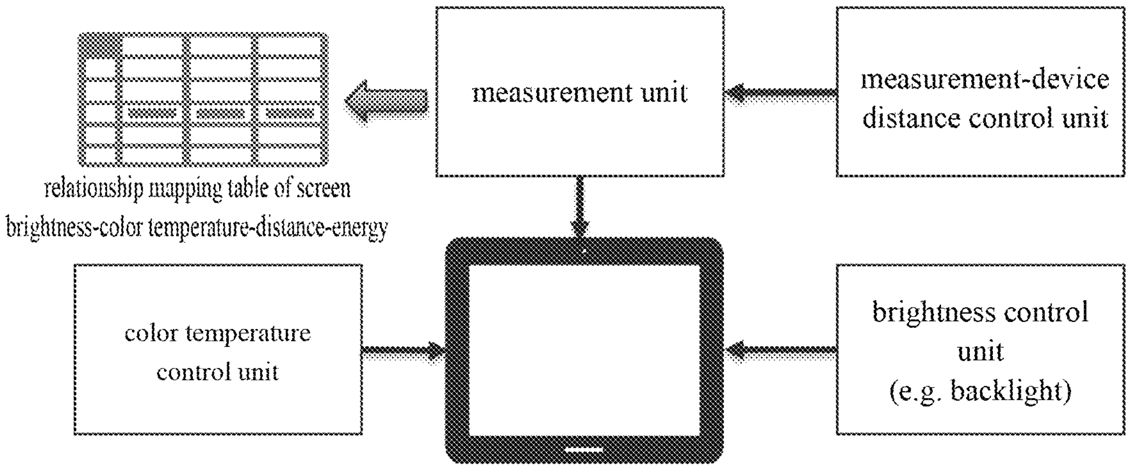
FIG. 7 is an interactive schematic diagram of a color temperature adjustment device according to another exemplary embodiment of the present invention.

Further, in the embodiment, in addition to the distance detection unit, the brightness detection unit, the color temperature determination unit, and the color temperature control unit, the color temperature adjustment device may also comprise a brightness control unit, a measurement unit, and a measurement-device distance control unit. As shown in FIG. 6, the color temperature adjustment device can measure the relationship mapping table of screen brightness-distance-blue light energy through the cooperation of the brightness control unit, the measurement unit, and the measurement-device distance control unit. Moreover, as shown in FIG. 7, the color temperature adjustment device can also generate a relationship mapping table of screen brightness-color temperature-distance-blue light energy through the cooperation of the brightness control unit, the measurement unit, the measurement-device distance control unit, and the color temperature control unit.

Embodiment 3

The illumination experienced by the user can be measured based on the brightness of the screen and the distance of the user. That is, the illumination mapping table for all combinations of the brightness of the screen measured by an optical instrument and user distance can be obtained. The illumination mapping table can be stored into the device memory for a search operation during the subsequent color temperature control operation. For the adjustment of the actual color temperature is adjusted, the illuminance at the current brightness of the screen and the current distance can be found or obtained by checking the illumination mapping table, that is, the current illuminance Currentilluminance-illuminanceLUT (the current brightness of the screen, the current distance of the user). Then, a comfortable color temperature range of the screen under the illumination according to the Kruithof curve, that is, wherein TargetCCT [Min,Max]=KruithofCurve (Currentilluminance), KruithofCurve (Currentilluminance) represents the comfortable color temperature range defined by the Kruithof curve that is found or obtained based on the input, and TargetCCT [Min,Max] represents a lower limit and an upper limit of the target color temperature range. Then, the target color temperature is determined based on the comfortable color temperature range of the screen under the illumination. For example, the middle value TargetCCTETargetCCT[Min, Max] of the target color temperature range is taken as the target color temperature.

Figure 8:
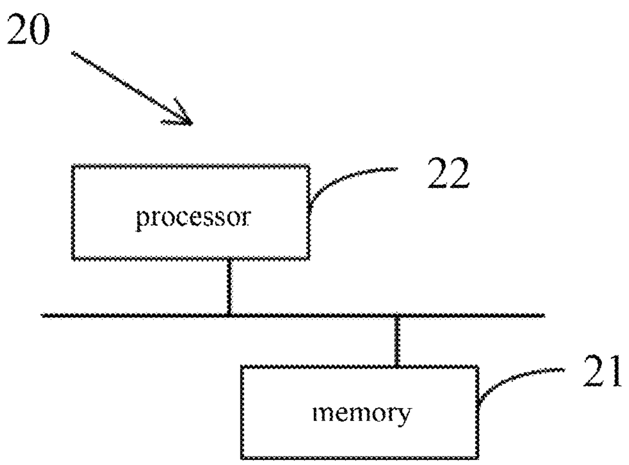
FIG. 8 is a schematic structural diagram showing an electronic device according to an exemplary embodiment of the present invention.

FIG. 8 is a schematic structural diagram showing an electronic device according to an exemplary embodiment of the present invention. An electronic device 20 comprises a processor 22. The processor 22 operates to execute instructions to implement the above color temperature adjustment method. For the specific implementation process, please refer to the description of the above embodiments, and the related description is omitted here.

The processor 22 may be called a CPU (Central Processing Unit). The processor 22 may be an integrated circuit chip with capability of processing signals. The processor 22 may be a general purpose processor, a digital signal processor (DSP), an application specific integrated circuit (ASIC), a field programmable gate array (FPGA) or another programmable logic device, a discrete gate or transistor logic device, or a discrete hardware component. The general purpose processor may be a microprocessor, or the processor 22 may be any conventional processor.

The electronic device 20 may further comprise a memory 21 for storing instructions and data required for the operation of the processor 22.

The processor 22 is configured to execute instructions to implement the color temperature adjustment method in any one of the embodiments of the present invention and a method provided by any non-conflicting combination of the embodiments.

Figure 9:
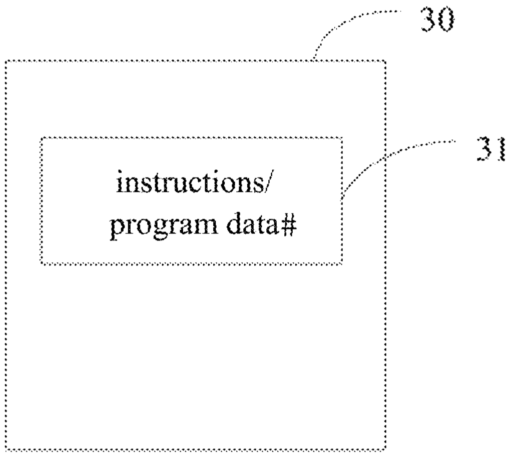
FIG. 9 is a schematic structural diagram showing a computer-readable storage medium according to an exemplary embodiment of the present invention.

FIG. 9 is a schematic structural diagram showing a computer-readable storage medium according to an exemplary embodiment of the present invention. A computer-readable storage medium 30 of the embodiment of the present invention stores instructions/program data 31. When the instructions/program data 31 are executed, the color temperature adjustment method in any one of the embodiments of the present invention and a method provided by any non-conflicting combination of the embodiments is implemented. The instructions/program data 31 can form a program file and be stored in the aforementioned storage medium 30 in the form of a software product so that a computer device (for example, a personal computer, a server, or a network device, etc.) or a processor executes all or part of the steps of the method of each of the embodiments. The aforementioned storage medium 30 comprises a U disk, a mobile hard disk, a read-only memory (ROM), a random access memory (RAM), a magnetic disk, an optical disk, or another medium that can store program codes, or comprises a terminal equipment such as a computer, a server, a mobile phone, or a tablet.

In the embodiments provided in the present invention, it should be understood that the disclosed system, device, and method can be implemented in other ways. For example, the device embodiments described above are only illustrative. For example, the division of the units is achieved based on logical functions. In actual implementation, the division of the units can be achieved by other division ways. For example, multiple units or components may be combined or integrated to another system, or some features can be ignored or can be not implemented. On the other hand, the shown or discussed coupling or direct coupling or communication connection between each other may be achieved by some interfaces, and the indirect coupling or communication connection between devices or units may be in an electrical, mechanical or other form.

In addition, various functionals unit in each embodiment of the present invention can be integrated into one processing unit, or each unit can exist physically alone, or two or more units can be integrated into one unit. The above integrated units can be implemented in the form of hardware or in software functional units.

It should also be noted that the terms "comprise", "include," or any other variation thereof are intended to cover a non-exclusive inclusion so that a process, method, article, or apparatus that includes a series of elements comprises not only those elements, but also other elements are not expressly listed or inherent elements for the process, method, article or apparatus. Without further limitation, elements qualified by the statement "comprise a . . . " do not exclude the presence of additional identical elements in the process, method, article, or apparatus that comprises the elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A color temperature adjustment method comprising:

determining display brightness of an image and a viewing distance, wherein the viewing distance is a distance between a user and the image;

determining a target color temperature based on the display brightness of the image and the viewing distance for adjusting blue light energy, wherein determining the target color temperature comprises:

determining a first adjustment ratio corresponding to the display brightness of the image and a second adjustment ratio corresponding to the viewing distance, wherein the display brightness of the image is negatively correlated with the first adjustment ratio, and the viewing distance is positively correlated to the second adjustment ratio; and calculating the target color temperature based on the first adjustment ratio and the second adjustment ratio, wherein the calculating comprises multiplying the first adjustment ratio by the second adjustment ratio and a current color temperature/a preset color temperature of the image to obtain the target color temperature; and adjusting the current color temperature/preset color temperature of the image to the target color temperature.

2. The color temperature adjustment method as claimed in claim 1, wherein determining the target color temperature based on the display brightness of the image and the viewing distance for adjusting blue light energy further comprises:

obtaining the target color temperature from a lookup table of display brightness of images, viewing distances, and target color temperatures according to the display brightness of the image and the viewing distance.

3. The color temperature adjustment method as claimed in claim 2, wherein:

the lookup table of display brightness of images, viewing distances, and target color temperatures is a lookup table of display brightness of images, viewing distances, blue light energy, and target color temperatures, and obtaining the target color temperature from a lookup table of display brightness of images, viewing distances, and target color temperatures according to the display brightness of the image and the viewing distance comprises:

determining target blue light energy at the display brightness of the image and the viewing distance; and obtaining the target color temperature at the display brightness of the image, the viewing distance, and the target blue light energy from the lookup table of display brightness of images, viewing distances, blue light energy, and target color temperatures.

4. The color temperature adjustment method as claimed in claim 1, wherein determining a target color temperature based on the display brightness of the image and the viewing distance further comprises:

determining illuminance at the display brightness of the image and the viewing distance; and determining the target color temperature based on the illuminance.

5. The color temperature adjustment method as claimed in claim 4, wherein determining illuminance at the display brightness of the image and the viewing distance comprises:

obtaining the illuminance at the display brightness of the image and the viewing distance from a lookup table of display brightness of images, viewing distances, and illuminance; or taking the display brightness of the image and the viewing distance into a first law of illumination to obtain the illuminance at the display brightness of the image and the viewing distance.

6. The color temperature adjustment method as claimed in claim 4, wherein the target color temperature is determined according to the illumination and a Kruithof curve.

7. The color temperature adjustment method as claimed in claim 1, wherein determining display brightness of an image and a viewing distance comprises:

detecting the viewing distance using a distance sensor or camera.

8. A display device, comprising:

a memory; and a processor, wherein the memory and the processor are coupled to each other, and the processor is configured to execute program instructions stored in the memory to:

determine display brightness of an image and a viewing distance, wherein the viewing distance is a distance between a user and the image;

determine a target color temperature based on the display brightness of the image and the viewing distance for adjusting blue light energy, wherein determining the target color temperature comprises:

determining a first adjustment ratio corresponding to the display brightness of the image and a second adjustment ratio corresponding to the viewing distance, wherein the display brightness of the image is negatively correlated with the first adjustment ratio, and the viewing distance is positively correlated to the second adjustment ratio; and calculating the target color temperature based on the first adjustment ratio and the second adjustment ratio, wherein the calculating comprises multiplying the first adjustment ratio by the second adjustment ratio and a current color temperature/a preset color temperature of the image to obtain the target color temperature; and adjust the current color temperature/preset color temperature of the image to the target color temperature.

9. A non-transitory, computer-readable storage medium storing instructions/program data, wherein the instructions/program data are executed by a processor to cause the processor to:

determine display brightness of an image and a viewing distance, wherein the viewing distance is a distance between a user and the image;

determine a target color temperature based on the display brightness of the image and the viewing distance for adjusting blue light energy, wherein determining the target color temperature comprises:

determining a first adjustment ratio corresponding to the display brightness of the image and a second adjustment ratio corresponding to the viewing distance, wherein the display brightness of the image is negatively correlated with the first adjustment ratio, and the viewing distance is positively correlated to the second adjustment ratio; and calculating the target color temperature based on the first adjustment ratio and the second adjustment ratio, wherein the calculating comprises multiplying the first adjustment ratio by the second adjustment ratio and a current color temperature/a preset color temperature of the image to obtain the target color temperature; and adjust the current color temperature/preset color temperature of the image to the target color temperature.

* * * * *